(12) United States Patent
Bharghavan et al.

(10) Patent No.: US 9,185,618 B1
(45) Date of Patent: *Nov. 10, 2015

(54) SEAMLESS ROAMING IN WIRELESS NETWORKS

(75) Inventors: Vaduvur Bharghavan, Morgan Hill, CA (US); Berend Dunsbergen, San Jose, CA (US)

(73) Assignee: Meru Networks, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/550,061

(22) Filed: Aug. 28, 2009

Related U.S. Application Data

(63) Continuation-in-part of application No. 11/715,284, filed on Mar. 7, 2007, which is a continuation of application No. 11/298,864, filed on Dec. 9, 2005, now abandoned, which is a continuation-in-part of application No. 11/294,673, filed on Dec. 5, 2005.

(60) Provisional application No. 61/095,578, filed on Sep. 9, 2008.

(51) Int. Cl.
  *H04W 36/18* (2009.01)
  *H04W 36/38* (2009.01)

(52) U.S. Cl.
  CPC .............. *H04W 36/18* (2013.01); *H04W 36/38* (2013.01)

(58) Field of Classification Search
  CPC ............ H04W 36/00; H04W 36/0011; H04W 36/0083; H04W 84/12; H04W 88/08; H04W 92/20; H04L 12/4641; H04L 63/0272
  USPC ......................................... 370/328, 331, 338
  See application file for complete search history.

(56) References Cited

U.S. PATENT DOCUMENTS

| 3,956,749 A | 5/1976 | Magorian |
| 5,038,151 A | 8/1991 | Kaminski |
| 5,125,108 A | 6/1992 | Talwar |

(Continued)

FOREIGN PATENT DOCUMENTS

| JP | 2005311580 | 11/2005 |
| JP | 2006229972 | 8/2006 |

OTHER PUBLICATIONS

Habib et al. "Multi-antenna techniques for OFDM based WLAN." Proceedings of First International Conference on Next-Generation Wireless Systems, Jan. 2006, pp. 186-190.

(Continued)

*Primary Examiner* — George Eng
*Assistant Examiner* — Marcus Hammonds
(74) *Attorney, Agent, or Firm* — Law Office of Dorian Cartwright

(57) ABSTRACT

A system and method for providing a seamless transition between access points for mobile devices. The method comprises associating a unique identifier for a plurality of mobile stations with a unique identifier for a first network in an acknowledgment table, then, upon receiving a frame from a mobile station, acknowledging the reception of the frame if the frame includes the unique identifier for the mobile station and the unique identifier for the network. The transfer of operation between access points is effectuated through the use of control circuitry which transfers portions of the contents of the acknowledgement table between various access points. This has the effect that the mobile stations does not sense a change in access points and thus the roaming from a first access point to a second access point is seamless.

10 Claims, 1 Drawing Sheet

Per Station Bssid example

(56) References Cited

U.S. PATENT DOCUMENTS

| | | | |
|---|---|---|---|
| 5,177,788 A | 1/1993 | Schanning et al. | |
| 5,337,397 A | 8/1994 | Lebby et al. | |
| 5,519,706 A | 5/1996 | Bantz et al. | |
| 5,884,272 A | 3/1999 | Walker et al. | |
| 5,966,094 A | 10/1999 | Ward et al. | |
| 6,023,621 A | 2/2000 | Jackson et al. | |
| 6,658,047 B1 | 12/2003 | Komulainen et al. | |
| 6,721,334 B1 | 4/2004 | Ketcham | |
| 6,728,603 B2 | 4/2004 | Pruzan et al. | |
| 6,760,318 B1 | 7/2004 | Bims | |
| 6,788,658 B1 * | 9/2004 | Bims | 370/328 |
| 6,839,038 B2 | 1/2005 | Weinstein | |
| 6,877,043 B2 | 4/2005 | Mallory et al. | |
| 6,894,649 B2 | 5/2005 | Ostervall | |
| 6,933,909 B2 | 8/2005 | Theobold | |
| 6,950,629 B2 | 9/2005 | Nagy | |
| 6,954,177 B2 | 10/2005 | Channabasappa et al. | |
| 6,978,158 B2 | 12/2005 | Ghavami | |
| 6,999,802 B2 | 2/2006 | Kim | |
| 7,057,566 B2 | 6/2006 | Theobold | |
| 7,171,215 B2 | 1/2007 | Khouaja et al. | |
| 7,194,008 B2 | 3/2007 | Chu et al. | |
| 7,197,308 B2 | 3/2007 | Singhal et al. | |
| 7,277,728 B1 | 10/2007 | Kauhanen | |
| 7,319,685 B2 | 1/2008 | Kim et al. | |
| 7,333,455 B1 | 2/2008 | Bolt et al. | |
| 7,359,362 B2 | 4/2008 | King et al. | |
| 7,400,604 B2 | 7/2008 | Lee et al. | |
| 7,403,506 B2 | 7/2008 | Lee et al. | |
| 7,406,319 B2 | 7/2008 | Kostic et al. | |
| 7,420,942 B2 | 9/2008 | Wang | |
| 7,426,388 B1 | 9/2008 | Wright et al. | |
| 7,430,397 B2 | 9/2008 | Suda et al. | |
| 7,433,722 B2 | 10/2008 | Sakamoto et al. | |
| 7,444,425 B2 | 10/2008 | Lehmann, Jr. et al. | |
| 7,466,981 B1 | 12/2008 | Abdelhamid et al. | |
| 7,499,673 B2 | 3/2009 | Saliga et al. | |
| 7,515,909 B2 | 4/2009 | Jain et al. | |
| 7,555,287 B1 | 6/2009 | Heinonen et al. | |
| 7,630,402 B2 | 12/2009 | Un et al. | |
| 7,630,403 B2 | 12/2009 | Ho et al. | |
| 7,693,513 B2 | 4/2010 | Chou | |
| 7,826,426 B1 | 11/2010 | Bharghavan et al. | |
| 7,843,910 B2 | 11/2010 | Loughran et al. | |
| 8,027,637 B1 | 9/2011 | Bims | |
| 8,090,374 B2 | 1/2012 | Rezvani et al. | |
| 8,472,359 B2 | 6/2013 | Bharghavan et al. | |
| 8,787,309 B1 | 7/2014 | Bharghavan et al. | |
| 2002/0022483 A1 | 2/2002 | Thompson et al. | |
| 2002/0060995 A1 | 5/2002 | Cervello et al. | |
| 2002/0086640 A1 | 7/2002 | Belcher et al. | |
| 2002/0112008 A1 | 8/2002 | Christenson et al. | |
| 2002/0147031 A1 | 10/2002 | Hood | |
| 2002/0181629 A1 | 12/2002 | Shibata | |
| 2003/0162546 A1 | 8/2003 | Jordan | |
| 2003/0198305 A1 | 10/2003 | Taylor et al. | |
| 2003/0199247 A1 | 10/2003 | Striemer | |
| 2003/0206532 A1 * | 11/2003 | Shpak | 370/322 |
| 2003/0206535 A1 | 11/2003 | Shpak | |
| 2003/0207697 A1 * | 11/2003 | Shpak | 455/524 |
| 2003/0207698 A1 * | 11/2003 | Shpak | 455/525 |
| 2003/0207699 A1 | 11/2003 | Shpak | |
| 2003/0236103 A1 | 12/2003 | Tamaki et al. | |
| 2004/0051668 A1 | 3/2004 | Chang | |
| 2004/0063455 A1 * | 4/2004 | Eran et al. | 455/525 |
| 2004/0121770 A1 | 6/2004 | Tigerstedt et al. | |
| 2004/0141617 A1 * | 7/2004 | Volpano | 380/270 |
| 2004/0156399 A1 | 8/2004 | Eran | |
| 2004/0183726 A1 | 9/2004 | Theobold | |
| 2004/0185904 A1 | 9/2004 | Yamakita | |
| 2004/0235453 A1 | 11/2004 | Chen et al. | |
| 2005/0054370 A1 * | 3/2005 | Shpak | 455/525 |
| 2005/0111405 A1 | 5/2005 | Kanterakis | |
| 2005/0122919 A1 | 6/2005 | Touag | |
| 2005/0135321 A1 | 6/2005 | Sharony | |
| 2005/0152314 A1 | 7/2005 | Sun et al. | |
| 2005/0153713 A1 | 7/2005 | Sharony | |
| 2005/0156794 A1 | 7/2005 | Theobold et al. | |
| 2005/0156799 A1 | 7/2005 | Theobold | |
| 2005/0195110 A1 | 9/2005 | Lin et al. | |
| 2005/0219143 A1 | 10/2005 | Schadler et al. | |
| 2005/0220048 A1 | 10/2005 | Lee et al. | |
| 2005/0238054 A1 | 10/2005 | Sharma | |
| 2005/0261970 A1 | 11/2005 | Vucina et al. | |
| 2006/0002331 A1 | 1/2006 | Bhagwat et al. | |
| 2006/0025127 A1 | 2/2006 | Cromer et al. | |
| 2006/0049987 A1 | 3/2006 | Herrick | |
| 2006/0056443 A1 | 3/2006 | Tao et al. | |
| 2006/0098613 A1 | 5/2006 | Kish et al. | |
| 2006/0111112 A1 | 5/2006 | Maveddat | |
| 2006/0132360 A1 | 6/2006 | Caimi et al. | |
| 2006/0203819 A1 | 9/2006 | Farinacci et al. | |
| 2006/0215691 A1 | 9/2006 | Kobayashi et al. | |
| 2006/0221993 A1 | 10/2006 | Liao et al. | |
| 2006/0281500 A1 | 12/2006 | Huang et al. | |
| 2007/0014267 A1 | 1/2007 | Lam et al. | |
| 2007/0026807 A1 | 2/2007 | Kish | |
| 2007/0117514 A1 | 5/2007 | Gainey et al. | |
| 2007/0165610 A1 | 7/2007 | Tseng et al. | |
| 2007/0195725 A1 | 8/2007 | Iino et al. | |
| 2007/0213071 A1 | 9/2007 | Hwang | |
| 2008/0014956 A1 | 1/2008 | Balasubramanian | |
| 2008/0102835 A1 | 5/2008 | Zhao et al. | |
| 2008/0112373 A1 * | 5/2008 | Shpak | 370/338 |
| 2008/0153497 A1 | 6/2008 | Kalhan | |
| 2008/0165866 A1 | 7/2008 | Teo et al. | |
| 2008/0167093 A1 | 7/2008 | Nagano et al. | |
| 2008/0212535 A1 | 9/2008 | Karaoguz et al. | |
| 2008/0242305 A1 | 10/2008 | Kahlert et al. | |
| 2008/0287130 A1 | 11/2008 | Laroia et al. | |
| 2009/0022127 A1 | 1/2009 | Traynor et al. | |
| 2009/0023434 A1 | 1/2009 | Trainor et al. | |
| 2009/0061873 A1 | 3/2009 | Bao et al. | |
| 2009/0061879 A9 | 3/2009 | Gallagher et al. | |
| 2009/0111472 A1 | 4/2009 | Promenzio et al. | |
| 2009/0252165 A1 | 10/2009 | Zhang et al. | |
| 2010/0080151 A1 | 4/2010 | Proctor et al. | |
| 2011/0040969 A1 | 2/2011 | Yao et al. | |
| 2011/0188484 A1 | 8/2011 | Reznik et al. | |
| 2011/0305217 A1 | 12/2011 | Seok | |
| 2012/0307792 A1 | 12/2012 | Ram et al. | |
| 2012/0314696 A1 | 12/2012 | Liu | |
| 2012/0317619 A1 | 12/2012 | Dattagupta et al. | |
| 2013/0148609 A1 | 6/2013 | Ram et al. | |
| 2013/0188539 A1 | 7/2013 | Han et al. | |
| 2014/0112322 A1 | 4/2014 | Ram et al. | |
| 2014/0126466 A1 | 5/2014 | Hamdi et al. | |

OTHER PUBLICATIONS

Kitahara et al. "A base station adaptive antenna for downlink transmission in a DS-CDMA system." IEEE 51st Vehicular Technology Conference Proceedings, 2000. (Abstract).

Mahler et al. "Design and optimisation of an antenna array for WiMAX base stations." IEEE/ACES International Conference on Wireless Communications and Applied Computational Electromagnetics, 2005. (Abstract).

Miaris et al "On the base stations antenna system design for mobile communications." Electrical Engineering, 2006, pp. 157-163, vol. 88.

Miura et al. "Study of array pattern tuning method using hybrid genetic algorithms for figure-8 satellite's earth station antenna." Asia-Pacific Microwave Conference Proceedings, 2000. (Abstract).

Ponnapalli et al. "Design and packaging of antennas for wireless systems." Proceedings of Electrical Performance of Electrical Packaging, 1995. (Abstract).

Sarolic. "Base station antenna near-field radiation pattern distortion analysis." Sixth International Conference on Computational Methods for the Solution of Electrical and Electromagnetic Engineering Problems Incorporating Electromagnetic Effects on Human Beings and Equipment Seminar, 2003. (Abstract).

IEEE. Part 11: Wireless LAN Medium Access Control (MAC) and

(56) References Cited

OTHER PUBLICATIONS

Physical Layer (PHY) specifications. IEEE Std. 802.11, 1999 Edition (R2003), 2003, vol. no. pp. i-513.
Sarolic. "Base station antenna near-field radiation pattern distortion analysis." Transactions on Engineering Sciences, 2003, pp. 1-10, vol. 41, WIT Press.
Amir. "Fast Handoff for Seamless Wireless Mesh Networks." MobiSys '06, Jun. 19-22, 2006, pp. 83-95, ACM, Uppsala, Sweden.
Business Wire. "Meru Networks Delivers Industry's Only Zero-Loss Mobility Across WLAN Access Points and IP Subnets." Jun. 21, 2004, pp. 1-2.
Chen et al. "A Seamless Handoff Mechanism for DHCP-Based IEEE 802.11 WLANS." IEEE Communications Letters, Aug. 2007, pp. 665-667, vol. 1, No. 8. (Abstract).
Cheung et al. "Network Configurations for Seamless Support of CDMA Soft Handoffs Between Cell Clusters." IEEE Journal on Selected Areas in Communications, Sep. 1997, pp. 1276-1278, vol. 15, No. 7.
Chou et al. "Intelligent Agent Over Wlan With Seamless Handover and Load Balancing." 2006 International Conference on Communication Technology, Nov. 27-Nov. 30 2006, pp. 1-7, IEEE. (Abstract).
Chui et al. "An Access Point Coordination System for Improved VoIP/WLAN Handover Performance." IEEE, 2006, pp. 501-505. (Abstract).
Fan et al. "Managing Heterogeneous Access Networks." 32nd IEEE Conference on Local Computer Networks, 2007, pp. 651-658, IEEE 2007, pp. 651-658.
Finneran. "Can WLAN switches support voice? Today's controllers offer key security and QOS capabilities, but as always, the devil's in the details." Business Communications Review, Oct. 2006, pp. 42-47.
Huang et al. "Incorporating AP Selection and Call Admission Control for Seamless Handoff Procedure." Proceedings of the International Conference on Computer and Communication Engineering 2008, pp. 823-826.
Huang et al. "SAP: Seamless Authentication Protocol for Vertical Handoff in Heterogeneous Wireless Networks." Third International Conference in Heterogeneous Wired/Wireless Networks, Aug. 7-9 2006, pp. 1-10, Waterloo, ON, CA.
Hur et al. "A Distributed-Request-Based DiffSery CAC for Seamless Fast-Handoff in Mobile Internet." J. Sole-Pareta et al. (Eds.): QofIS 2004: International Workshop on Quality of Future Internet Services, LNCS 3266, pp. 184-193, 2004.
Jang et al. "Mobility Support Algorithm Based on Wireless 802.11b LAN for Fast Handover." 5th International Conference, PDCAT 2004, Dec. 8-10 2004, pp. 715-718, Springer Verlag. (Abstract).
Jinfang et al. "A Seamless Handoff Scheme for Mobile IP." 2006 IEEE 63rd Vehicular Technology Conference, VTC 2006-Spring, May 7-Jul. 10, 2006, pp. 927-931, IEEE. (Abstract).
Kist. "Instant Handoffs for Wireless Infrastructure Meshed Networks." Proceedings of the 2008 Australasian Telecommunication Networks and Applications Conference, 2008, pp. 288-293.
Liao et al. "Practical Schemes for Smooth MAC Layer Handoff in 802.11 Wireless Networks. Proceedings of the 2006 International Symposium on a World of Wireless, Mobile and Multimedia Networks". IEEE, 2006, pp. 1-10.
LV et al "Intelligent Seamless Vertical Handoff Algorithm for the Next Generation Wireless Networks." Mobilware '08, Feb. 12-15, 2008, pp. 1-5, Innsbruck, Austria.

Mannion. "Foundry Networks enters WLAN management fray—Bets on integration with wired infrastructure, market timing to take on Cisco." Electronic Engineering Times, Sep. 8, 2003, 2 pages.
Manodham et al. "A Seamless Handoff Scheme with New AP Module for Wireless LANs support VoIP." Proceedings of the 2005 Symposium on Applications and the Internet, 2006, pp. 1-6, IEEE.
Marsh. "Power and wireless options extend Ethernet's reach: Ethernet's power-delivery and wireless abilities offer new application potential that hugely extends the reach of the IEEE's 802.X series of standards." EDN, Nov. 11, 2004, p. 1-7, Reed Business Information.
Murray et al. "Intelligent Access and Mobility Management in Heterogeneous Wireless Networks Using Policy." ACM First International Workshop on Information and Communication Technologies, 2003, pp. 181-186.
Rist et al. "Wireless LANS—Look, Ma. ..No Wires—Wireless networking products prove they are finally ready for prime time." InternetWeek, Mar. 20, 2000, p. 41, No. 805, CMP Media, Inc.
Sattari et al. "Seamless Handover Between WLAN and UMTS." 2004 IEEE 59th Vehicular Technology Conference, VTC2004-Spring: Towards a Global Wireless World, May 17-19, 2004, pp. 3035-3038, IEEE. (Abstract).
Thomsen. "Development Platform for Dynamic Bandwidth Allocation Schemes in Future MPCP Enabled Ethernet Passive Optical Network (EPON)." WSEAS Transactions on Communications, Apr. 5, 2006, pp. 92-98, WSEAS. (Abstract).
Wei et al. "Seamless Handoff Support in Wireless Mesh Networks." 2006, pp. 1-8, IEEE.
Xhafa et al. "Seamless Handover in Building Using HVAC Ducts: A New System Architecture." IEEE Global Telecommunications Conference GLOBECOM'03, Dec. 1-5 2003, pp. 3093-3097, IEEE.
Yaakob et al. "An Integration of Mobile Motion Prediction with Dedicated Solicitation Message for Seamless Handoff Provisioning in High Speed Wireless Environment." 2008 International Conference on Electronic Design, Dec. 1-3, 2008, Pernang, Malaysia, pp. 1-5.
Yamagata et al. "Seamless Handover for Hotspot Network Using Adaptive Flow Control Method." 2005 Asia—Pacific Conference on Communications, Oct. 3-5 2005, pp. 502-506, IEEE. (Abstract).
Zhou et al. A Seamless Handoff Scheme for Mobile IP.' IEEE Vehicular Technology Conference, 2006, pp. 927-931, vol. 2. (Abstract).
Chen et al. "A Seamless Handoff Mechanism for DHCP-Based IEEE 802.11 WLANS." IEEE Communications Letters, Aug. 2007, pp. 665-667, vol. 1, No. 8.
Chui et al. "An Access Point Coordination System for Improved VoIP/WLAN Handover Performance." IEEE, 2006, pp. 501-505.
Hur et al. "Distributed-Request-Based Diffsery CAC for Seamless Fast-Handoff in Mobile Internet." J. Sole-Pareta et al. (Eds.): Q of IS 2004: International Workshop on Quality of Future Internet Services, LNCS 3266, 25 pages, Sep. 30, 2004.
IEEE Std 802. 11-1997 Information Technology-telecommunications and Information exchange between systems-Local and Metropolitan Area Networks-specific Requirements-part 11: Wireless Lan Medium Access Control (MAC) and Physical Layer (PHY) Specifications, IEEE Std 802.11-1997, vol., no., pp. i-445, Nov. 18, 1997.
Liao et al. "Practical Schemes for Smooth MAC Layer Handoff in 802.11 Wireless Networks." Proceedings of the 2006 International Symposium on a World of Wireless, Mobile and Multimedia Networks. IEEE, 2006, pp. 1-10.

\* cited by examiner

| StaMac 1 | Bssid 1 |
| --- | --- |
| StaMac 2 | Bssid 2 |
| ... | |
| StaMac n | Bssid n |
Figure 1: Ack Table
| FrameCtrl | Address 1 | Address 2 | Address 3 | ....... |
| --- | --- | --- | --- | --- |
Figure 2: 802.11 Frame Format
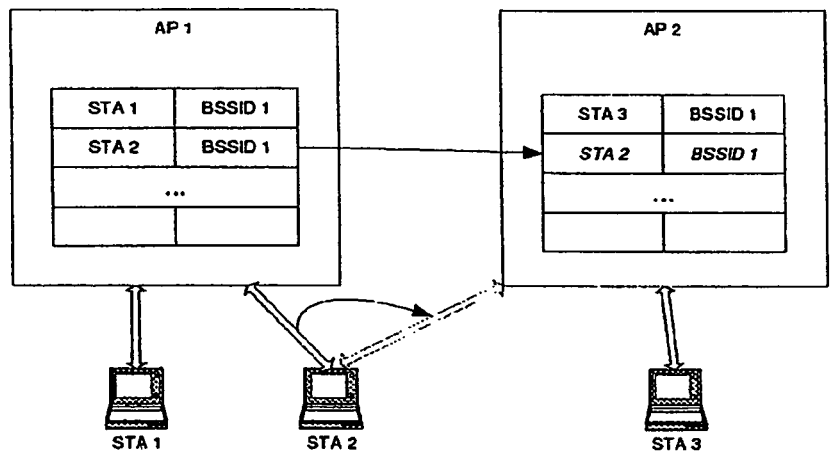
Figure 3: Shared Bssid example
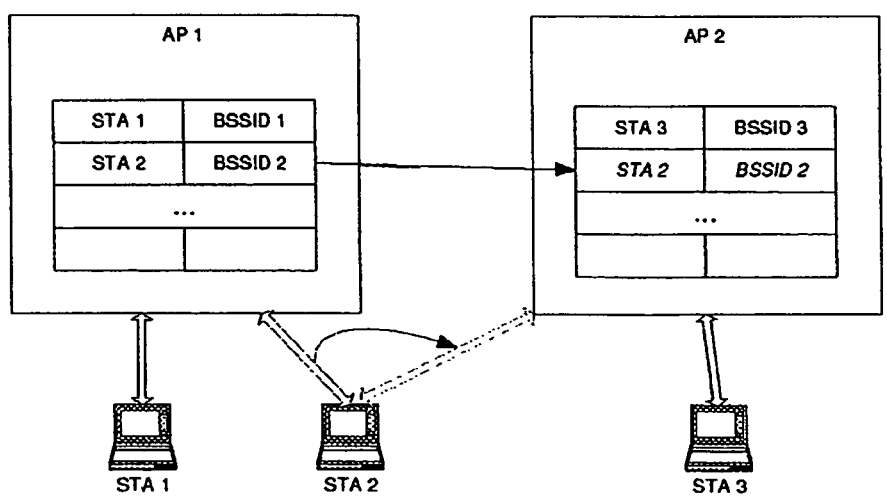
Figure 4: Per Station Bssid example

SEAMLESS ROAMING IN WIRELESS NETWORKS

INCORPORATED DISCLOSURES AND RELATED APPLICATIONS

This application claims the priority of, and hereby includes by reference as if fully set forth herein, the following:
- U.S. Provisional Patent Application 61/095,578, filed Sep. 9, 2008, in the name of Vaduvur BHARGHAVAN and Berend DUNSBERGEN, titled "Seamless Roaming in Wireless Networks, assigned to the same assignee,
- U.S. patent application Ser. No. 11/715,287, filed Mar. 7, 2007, in the name of Vaduvur BHARGHAVAN, Sung-Wook HAN, Joseph EPSTEIN, Berend DUNSBERGEN, and Saravanan BALASUBRAMANIAN, titled "Seamless Mobility in Wireless Networks", assigned to the same assignee,
- which itself claims the priority of, and hereby incorporates by reference as if fully set forth herein, the following:
- U.S. patent application Ser. No. 11/298,864, filed Dec. 9, 2005, in the name of Vaduvur BHARGHAVAN, Sung-Wook HAN, Joseph EPSTEIN, Berend DUNSBERGEN, and Saravanan BALASUBRAMANIAN, titled "Seamless Mobility in Wireless Networks", and assigned to the same assignee,
- which itself claims the priority of, and hereby incorporates by reference as if fully set forth herein, the following:
- U.S. patent application Ser. No. 11/294,673, filed Dec. 5, 2005, in the name of Rajendran VENUGOPALACHARY, Senthil PALANISAMY, Srinith SARANG, and Vaduvur BHARGHAVAN, titled "Omni-Directional Antenna Supporting Simultaneous Transmission and Reception of Multiple Radios with Narrow Frequency Separation", and assigned to the same assignee.

These documents are sometimes referred to herein as the "Incorporated Disclosure" or the "Incorporated Disclosures".

In wireless communication, devices send and receive messages without necessarily being physically coupled therefor. Wireless devices sometimes include location sensors (such as those using GPS), portable computers, mobile telephones, and the like. Portable computers with wireless communication capability sometimes are coupled to a computer network, such as the Internet or the World Wide Web. The IEEE 802.11 standards (including IEEE standard 802.11a, IEEE standard 802.11b, IEEE standard 802.11g, and IEEE standard 802.11n) include techniques for coupling wireless devices to computer communication networks. In the IEEE 802.11 standards, wireless devices seek out and select "access points", also called "AP's". Each wireless device associates itself with a particular AP, with which it communicates. Each wireless device, such as a mobile station, also called an "STA" (which might be moving), determines from time to time whether it has good communication with its associated AP, and whether it would have better communication with a different AP.

Access points exhibit a known deficiency when an STA moves beyond the effective range of an AP, because the STA needs to re-establish communication with a new AP, a process called "handoff". Handoff problems include loss of signal and decrease in QoS (Quality of Service). For applications requiring high QoS, such as digitally transmitting audio information, the latency time of the handoff can be uncomfortably perceptible to a human listener.

SUMMARY

Techniques, including apparatuses and methods for seamless transitions between AP's include associating a station UID (unique identifier) for a set of mobile stations, with a network UID for a $1^{st}$ network in an acknowledgment table. Upon receiving a frame from a mobile station in that set of mobile stations, reception of the frame is acknowledged only if the frame includes both the station UID for the mobile station and the network UID for the network. This has the effect that mobile stations might be associated with selected networks (and selected AP's), without troubling those AP's or their control hardware or software.

Transfer of a station's operation between AP's (i.e., handoff) is performed by transferring one or more portions of acknowledgment tables among AP's. This has the effect that AP's collectively know which AP is associated with that mobile station, and collectively respond to that mobile station only by its associated AP. This has the effect that when the AP's collectively (e.g., in response to a controller as described in the Incorporated Disclosures) determine that the mobile station should be transferred from a $1^{st}$ AP to a $2^{nd}$ AP, the mobile station does not sense a change in AP's, with the effect that any transfer from a $1^{st}$ AP to a $2^{nd}$ AP is substantially seamless to users of the mobile station.

This has the effect that AP's (or their controller, as described in the Incorporated Disclosures), determine to which AP each mobile station is associated, rather than the reverse (as generally specified by the IEEE standard protocols). In general, AP's and their controller are in a better position to determine to which AP a mobile station should be associated. Moreover, there is no particular requirement for a particular mobile station to undergo a time-consuming process of handoff when that mobile station should, from time to time, be associated with a different AP. This has the effect that the mobile station can be transferred between a $1^{st}$ AP and a $2^{nd}$ AP without troubling the mobile station, without even letting the mobile station know that the transfer has taken place, and without substantial latency in making the transfer.

DETAILED DESCRIPTION

Generality of Invention

This application should be read in its most general possible form. For example and without limitation:

- References to specific techniques include alternative and more general techniques, especially when discussing new aspects of the technologies, or how the invention might be made or used.
- References to "preferred" techniques generally mean that the inventors contemplate using those techniques in a suitable context, for example and without limitation, a commercial context, and think they are best for that contemplated context. This explicitly does not exclude other and further techniques for making or using the invention, and does not mean that the described techniques are necessarily essential or that they would be preferred in all contexts.
- References to contemplated causes and effects for some implementations do not preclude other causes or effects that might occur in other implementations.
- References to reasons for using particular techniques do not preclude other reasons or other techniques, even if completely contrary, where circumstances would indicate that the stated reasons or techniques are not as applicable.
- References to particular examples of techniques by which the invention might be made, used, or otherwise employed, do not preclude other examples or other techniques, even if completely contrary. After reading this application, those skilled in the art will recognize many other variations which are possible, which remain within the content, scope and spirit of the invention, and which would not require undue experimentation or new invention.

DEFINITIONS

This application should be read with these definitions in mind. These definitions are intended to show the most general form of the invention, and not to be restrictive in any way:

The phrase "access point", the term "AP", and the like, generally refer to devices capable of wireless communication with wireless devices and capable of either wired or wireless communication with other devices. The term "AP's", and the like, generally refers to a set of one or more such devices. For example, AP's might communicate with external devices using a L2/L3 network. However, in the context of the invention, there is no particular requirement that AP's have an actual wired communication link; AP's might communicate entirely wirelessly themselves.

The phrases "incoming message", "received frame", and the like, generally refer to a message packet or message frame sent by a wireless device or wireless station to one or more AP's, and received at a particular AP. Received frames might be sent by a wireless station to one or more AP's using one or more of the IEEE 802.11 wireless communication standards, some similar one or more standards, or some other one or more standards. The incoming message may be a unicast frame (i.e., intended for a single AP) or a multicast frame (i.e., intended for a set of, possibly multiple, AP's).

The phrases "outgoing message" and "transmit frame", and the like, generally refer to a message packet or message frame being sent to one or more wireless devices or stations from an AP. Transmit frames might be sent from an AP using one or more of the IEEE 802.11 wireless communication standards, some similar one or more standards, or some other one or more standards. The incoming message may be a unicast frame (i.e., intended for a single AP) or a multicast frame (i.e., intended for a set of, possibly multiple, AP's).

The phrase "wireless communication", and the like, generally refers to radio frequency or other electromagnetic communication. Wireless communication might make use of a wireless communication standard such as one or more of IEEE standards 802.11a, 802.11b, 802.11g, or 802.11n, some similar one or more standards, or some other one or more standards. However, in the context of the invention, there is no particular requirement that wireless communication or a communication network must necessarily (1) use radio spectrum, (2) use electromagnetic communication, or even (3) be entirely confined to untethered communication coupling. For examples, wireless communication might use sonic waves, possibly including ultrasound, or wireless communication might make use of both wired and unwired communication paths.

The phrases "wireless device", "wireless station", "mobile station" and the like, ("STAs") generally refer to devices capable of wireless communication with AP's. These devices need not be mobile, such as for example a desktop computer with wireless capability. Wireless communication might make use of a wireless communication standard such as one or more of IEEE standards 802.11a, 802.11b, 802.11g, or 802.11n, some similar one or more standards, or some other one or more standards. However, in the context of the invention, there is no particular requirement that one or more of these particular communication standards are used, e.g., the wireless communication might be conducted according to a standard other than an IEEE 802.11 standard, or even according to standard other than an IEEE standard entirely. Moreover, in the context of the invention, there is no particular requirement that all, or even a designated subset of, wireless devices use the same standard, or that such wireless devices even use inter-compatible communication standards.

Digital communications devices might operate using a multi-layer configuration, such as for example one including Application, Presentation, Session, Transport, Network, Data Link, and Physical layers. The term "layer", and the like, generally refers to a collection of related functions that provides services to one or more layers above it and receives services from one or more layers below it in a designated ordering. For example, a layer that provides error-free communications across a network might provide a path useful to applications above it, while that layer that provides error-free communications across a network might make use of one or more lower layers to send and receive packets that make up the contents of the path.

BRIEF DESCRIPTION OF THE DRAWINGS

FIG. 1 is a table illustrating an acknowledgment table ("ACK Table") as might be found in a memory device of an access point, or in the control circuitry of a wireless Communications device (i.e., a mobile device), according to an embodiment.

FIG. 2 is a table illustrating the beginning of a typical frame format for use in the IEEE 802.11 communications protocol, according to an embodiment.

FIG. 3 is a block diagram illustrating access points sharing a BSSID for a mobile station, according to an embodiment.

FIG. 4 is a block diagram illustrating access points utilizing a per station BSSID, according to an embodiment.

ACK Table Operation

FIG. 1

FIG. 1 illustrates an acknowledgment table ("ACK Table") as might be found in a memory device of an access point, or in the control circuitry of a wireless communications device (i.e., a mobile device). The ACK Table as shown provides for a data structure relating a station unique identifier such as a media access control (MAC) address of a mobile station to a basic service set identifier (BSSID), sometimes called herein a "network unique identifier" of a network. However, in the context of the invention, there is no particular requirement that these particular data items are used. Other, further, or distinct data elements might be used to match mobile stations with their associated networks.

A BSSID is used to identify one or more IEEE 802.11 wireless LAN's with which a mobile station attempts to communicate. An example of at least one vendor's implementation of an ACK Table implemented in a communications chip set is implemented and shown in Broadcom models 4342, 4322 and 4387. Other devices may have this same or a similar capability, whether or not from the same vendor.

In the ACK Table shown in the FIG. 1, a MAC address represents the physical address of a mobile device disposed for being connected to a network, generally expressed as a 48-bit hexadecimal number (i.e., 6 octets). Wireless networks are often included in a multi-layer configuration that allows for operation between hierarchies of systems. The MAC layer is generally a sublayer, as defined by the IEEE standard 802 protocols, of a networking layer. The MAC sublayer is responsible for delivering error-free data between two computers on the network.

Mobile stations are each associated with a station unique identifier, which is itself associated with a network unique identifier, the latter including a unique BSSID the mobile station might access, which is itself associated with one or more particular networks in a wireless communication system. This has the effect that the mobile station can access those particular networks, and no others. The mobile station's unique BSSID access ability might be moved from a $1^{st}$ AP to a $2^{nd}$ AP when reassigning the mobile station from the $1^{st}$ AP to the $2^{nd}$ AP. As only those AP's with the MAC address of the mobile station in their ACK Table will respond to the mobile station, the one or more AP's maintaining that unique BSSID are the only AP's that respond to message packets from the mobile station. While such AP's might be only one designated such AP at any particular time, in the context of the invention, there is no particular requirement for this restriction, and in fact, during transfer of a mobile station from a $1^{st}$ AP to a $2^{nd}$ AP, there will generally be at least some time during which the MAC address for that AP is present in the ACK Tables for each of the $1^{st}$ AP and the $2^{nd}$ AP. As the one or more AP's maintaining that unique BSSID are the only AP's that respond to message packets from that particular mobile station, this has the effect of limiting access by that particular mobile station to only networks available to those one or more AP's maintaining that unique BSSID.

FIG. 2

FIG. 2 shows the beginning of a typical frame format for use in the IEEE 802.11 communications protocol. Not all fields are necessarily present in every frame. Frame communication between the same devices may have different frame formats at different stages of the communication process. This may include changing frame formats between communication layers within a wireless communication device.

In operation, distinct receive frames might require differing responses or acknowledgments. For example and without limitation, a unicast MAC Protocol Data Unit (MPDU or MMPDU) receive frame generally requires, according to the IEEE 802 protocol standards, an ACK frame response. Other receive frames may require more efficient forms of acknowledgment such as BLOCK-ACK frames. Upon reception of a frame requiring an ACK, each AP receiving that frame will search its ACK Table for an entry where a MAC address matches a BSSID supported in the AP. Only if the received frame requires a response and a matching entry is found, will the AP respond with the appropriate response. The response type is based on the received frame.

Upon reception of a frame requiring an ACK, each AP receiving that frame will search its ACK Table for an entry where both the $Address_1$ matches the BSSID and the $Address_2$ matches the MAC address. Only if the received frame requires a response and a matching entry is found, will the AP respond with the appropriate response. The response type is in response to the received frame.

Shared BSSID

FIG. 3

FIG. 3 shows a functional block diagram of a sharing a BSSID. Mobile stations are configured to attempt to find available AP's for communication. Processors in the mobile stations evaluate factors for connections and make independent roaming decisions to make sure they are connected to the best AP. In preferred embodiments the mobile stations roam seamlessly across AP's because the roaming decisions are made by the infrastructure (APs and a controller). This has the effect that all handoffs between different APs are completely transparent to the mobile stations.

To effectuate seamless roaming, a $1^{st}$ access point AP, contains an ACK Table as described above. The ACK Table contains both mobile station MAC addresses and BSSIDs and is coupled to one or more mobile stations. For the transition of $STA_2$ from $AP_1$ to $AP_2$, both $AP_1$ and $AP_2$ support the same BSSID ($BSSID_1$). By creating a shared media environment with the same BSSID, both AP's can receive the same frame from $STA_2$. However, through the operation of the ACK Table, only the AP that has a complete matching entry in the ACK Table will respond to the STA. Before the transition, only $AP_1$ has complete information for $STA_2$. This has the effect that $STA_2$ transitions from $AP_1$ to $AP_2$ transparently because the STA does not sense that a different AP has taken over the communications link. Communication and coordination between the APs is preformed through the operation of the controller (not shown), which effects the proper ACK Table for each AP.

Per Station BSSID

FIG. 4

FIG. 4 shows a functional block diagram of using a per station BSSID. In the FIG. 4 an access point $AP_1$ is constructed with an ACK Table having a MAC address for each mobile station and an associated BSSID for each mobile station. To effectuate seamless roaming, the BSSID from the $1^{st}$ AP ($AP_1$) is transferred to the $2^{nd}$ AP ($AP_2$) during the transition. The transfer is effectuated by a controller (not shown). Through the operation of the ACK Table, only the AP that has a complete matching entry in the ACK Table will respond to the STA. Before the transition, only $AP_1$ has complete information for $STA_2$. During the transition, $AP_2$ receives complete ACK Table information relating to $STA_2$. After the transition, only $AP_2$ has complete ACK Table information for $STA_2$. This has the effect that $STA_2$ transitions from $AP_1$ to $AP_2$ transparently because the STA does not sense that a different AP has taken over the communications link. Communication and coordination between the AP's is performed through the operation of the controller, which effects the proper ACK Table for each AP.

Alternative Embodiments

The invention has applicability and generality to other aspects of wireless communication, and is not limited to wireless communication based upon IEEE 802.11 standards. After reading this application, those having skill in the art would recognize that the systems and methods disclosed herein my be effectuated using other techniques. For example and without limitation, the transmission time might be provided by the physical layer or data link layer to a higher level for determining the transmission time.

After reading this application, those skilled in the art would recognize that the scope and spirit of the invention include other and further embodiments beyond the specifics of those technologies disclosed herein, and that such other and further embodiments would not require undue experimentation or new invention.

The invention claimed is:

1. A computer-implemented method performed by an access point of a plurality of access points managed by a controller of a wireless communication network the method comprising the steps of:

associating a mobile station of a plurality of mobile stations with the access point by storing, at both the mobile station and the access point, a persistent, uniquely assigned BSSID (Basic Service Set Identifier) that is uniquely assigned to the mobile station among a plurality of persistent uniquely-assigned BSSIDs stored at the access point that are assigned to the plurality of mobile stations, wherein each of the plurality of access points independently using layer 2 communications and the persistent, uniquely-assigned BSSID is configured in the mobile station by the access point with a beacon frame or a probe response frame sent from the mobile station to the access point;

receiving a frame from the mobile station, the frame comprising a sender address defined by a MAC address unique to the mobile station and a receiver address defined by the persistent, uniquely-assigned BSSID;

responsive to matching the receiver address of the received frame to one of the stored plurality of persistent, uniquely-assigned BSSIDs, generating an ACK frame to send to the mobile station; and responsive to a handoff of the mobile station from the access point to another access point of the plurality of access points, disassociating the mobile station from the access point by deleting the persistent, uniquely-assigned BSSID, wherein the another access point associates with the mobile station by storing the persistent, uniquely-assigned BSSID allowing the mobile station to seamlessly continue to store and use the same persistent, uniquely-assigned BSSID for communication with the wireless communication network.

2. The method of claim 1, further comprising: receiving the persistent, uniquely-assigned BSSID from the controller assigning the mobile station to the access point.

3. The method of claim 1, further comprising: receiving a message from the controller disassociating the mobile station from the access point.

4. The method of claim 1, further comprising:
responsive to not matching the receiver address of the received frame to one of the stored BSSIDs, ignoring the received frame.

5. A non-transitory computer readable medium storing a computer program product that, when executed by a processor performs a method in an access point of a plurality of access points managed by a controller of a wireless communication network the method comprising the steps of:

associating a mobile station of a plurality of mobile stations with the access point by storing, at both the mobile station and the access point, a persistent, uniquely assigned BSSID (Basic Service Set Identifier) that is uniquely assigned to the mobile station among a plurality of persistent uniquely-assigned BSSIDs stored at the access point that are assigned to the plurality of mobile stations, wherein each of the plurality of access points independently using layer 2 communications and the persistent, uniquely-assigned BSSID is configured in the mobile station by the access point with a beacon frame or a probe response frame sent from the mobile station to the access point;

receiving a frame from the mobile station, the frame comprising a sender address defined by a MAC address unique to the mobile station and a receiver address defined by the persistent, uniquely-assigned BSSID;

responsive to matching the receiver address of the received frame to one of the stored plurality of persistent, uniquely-assigned BSSIDs, generating an ACK frame to send to the mobile station; and responsive to a handoff of the mobile station from the access point to another access point of the plurality of access points, disassociating the mobile station from the access point by deleting the persistent, uniquely-assigned BSSID, wherein the another access point associates with the mobile station by storing the persistent, uniquely-assigned BSSID allowing the mobile station to seamlessly continue to store and use the same persistent, uniquely-assigned BSSID for communication with the wireless communication network.

6. The at least one computer readable product of claim 5, further comprising: receiving the persistent, uniquely assigned BSSID from the controller assigning the mobile station to the access point.

7. The at least one computer readable product of claim 5, further comprising: receiving a message from the controller disassociating the mobile station from the access point.

8. The at least one computer readable product of claim 5, further comprising: responsive to not matching the receiver address of the received frame to one of the stored persistent, uniquely-assigned BSSIDs, ignoring the received frame.

9. The at least one computer readable product of claim 5, further comprising: receiving the persistent, uniquely assigned BSSID from the controller assigning the mobile station to the access point.

10. An access point of a plurality of access points managed by a controller of a wireless communication network, comprising:

a processor; and
a memory coupled to the processor and containing program code, which when executed cause the processor to:
associate a mobile station of a plurality of mobile stations with the access point by storing, at both the mobile station and the access point, a persistent, uniquely assigned BSSID (Basic Service Set Identifier) that is uniquely assigned to the mobile station among a plurality of persistent uniquely-assigned BSSIDs stored at the access point that are assigned to the plurality of mobile stations, wherein each of the plurality of access points independently using layer 2 communications and the persistent, uniquely-assigned BSSID is configured in the mobile station by the access point with a beacon frame or a probe response frame sent from the mobile station to the access point;

receive a frame from the mobile station, the frame comprising a sender address defined by a MAC address unique to the mobile station and a receiver address defined by the persistent, uniquely-assigned BSSID;

responsive to matching the receiver address of the received frame to one of the stored plurality of persistent, uniquely-assigned BSSIDs, generate an ACK frame to send to the mobile station; and responsive to a handoff of the mobile station from the access point to another access point of the plurality of access points, disassociate the mobile station from the access point by deleting the persistent, uniquely-assigned BSSID, wherein the another access point associates with the mobile station by storing the persistent, uniquely-assigned BSSID allowing the mobile station to seamlessly continue to store and use the same persistent, uniquely-assigned BSSID for communication with the wireless communication network.

\* \* \* \* \*